US008675618B2

(12) United States Patent
Lee et al.

(10) Patent No.: US 8,675,618 B2
(45) Date of Patent: Mar. 18, 2014

(54) LOGICAL CONNECTION ESTABLISHMENT METHOD FOR MOBILE TERMINAL

(75) Inventors: Hyun Hye Lee, Suwon-si (KR); Yoon Suk Choi, Daejon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1117 days.

(21) Appl. No.: 12/288,294

(22) Filed: Oct. 17, 2008

(65) Prior Publication Data

US 2009/0104906 A1  Apr. 23, 2009

(30) Foreign Application Priority Data

Oct. 19, 2007  (KR) .................. 10-2007-0105375

(51) Int. Cl.
*H04W 4/00* (2009.01)
(52) U.S. Cl.
USPC .......................................................... 370/338
(58) Field of Classification Search
USPC .......................................... 370/338, 348, 329
See application file for complete search history.

(56) References Cited

U.S. PATENT DOCUMENTS

| | | | | |
|---|---|---|---|---|
| 6,982,970 B2 * | 1/2006 | Takabatake et al. | .......... | 370/329 |
| 7,103,016 B1 * | 9/2006 | Duffy et al. | .................... | 370/312 |
| 7,133,371 B2 * | 11/2006 | Helm et al. | ................... | 370/270 |
| 7,873,383 B2 * | 1/2011 | Shimizu et al. | ............ | 455/552.1 |
| 7,882,234 B2 * | 2/2011 | Watanabe et al. | ............. | 709/227 |
| 2005/0090283 A1 * | 4/2005 | Rodriquez | ................. | 455/552.1 |
| 2005/0281211 A1 | 12/2005 | Takabatake et al. | | |

FOREIGN PATENT DOCUMENTS

| | | |
|---|---|---|
| JP | 2001186149 A | 7/2001 |
| JP | 2006319520 A | 11/2006 |
| KR | 20070053795 A | 5/2007 |

OTHER PUBLICATIONS

GSM Global System for Mobile Communications, "Generic Access to the A/Gb Interface; Stage 2", (Release 6); 3GPP TS 43.318 V6.1.0 (Apr. 2005), pp. 1-68.
GSM Global System for Mobile Communications, "Generic Access (GA) to the A/Gb Interface; Mobile GA interface layer 3 specification" (Release 7); 3GPP TS 44.318 V7. 4.0 (Sep. 2007), pp. 1-167.
Korean Office Action dated Oct. 25, 2013 in connection with Korean Patent Application No. 10-2007-0105375; 4 pages.

* cited by examiner

*Primary Examiner* — Mark Rinehart
*Assistant Examiner* — Mohammad Anwar

(57) ABSTRACT

A logical channel establishment method for a mobile terminal is provided for improving network connection possibility and connection reliability. A logical channel establishment method of the present invention includes transmitting a resource request message for establishing a logical connection to an unlicensed wireless access network via a base station; retransmitting, when a resource request rejection message is received or no response message is received before a timer expires, the resource request message after a retry timer expires; and repeating retransmission of the resource request message a threshold number of retransmission times until a logical connection is established.

17 Claims, 2 Drawing Sheets

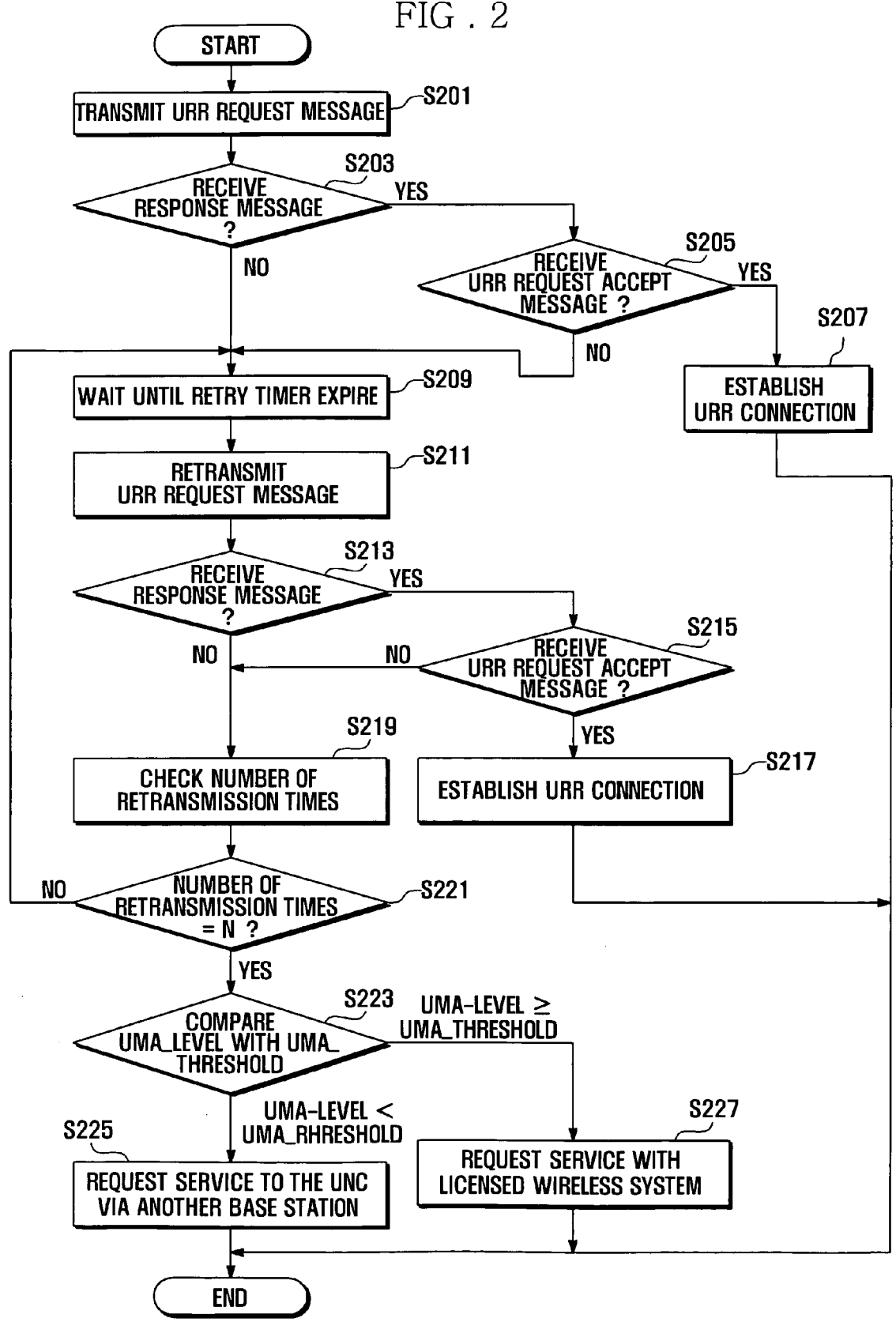

LOGICAL CONNECTION ESTABLISHMENT METHOD FOR MOBILE TERMINAL

CROSS-REFERENCE TO RELATED APPLICATION(S) AND CLAIM OF PRIORITY

The present application claims priority to an application entitled "LOGICAL CONNECTION ESTABLISHMENT METHOD FOR MOBILE TERMINAL" filed in the Korean Intellectual Property Office on Oct. 19, 2007 and assigned Serial No. 2007-0105375, the contents of which are incorporated herein by reference.

TECHNICAL FIELD OF THE INVENTION

The present invention relates to a mobile terminal and, in particular, to a logical channel establishment method for a mobile terminal that is capable of improving network connection possibility and connection reliability.

BACKGROUND OF THE INVENTION

Typically, licensed wireless systems such as general system for mobile communications (GSM), universal mobile telecommunications system (UMTS), and code division multiple access (CDMA) and unlicensed wireless system such as wireless fidelity (Wi-Fi), Bluetooth, and radio frequency identification (RFID) are deployed individually in overlapping coverage areas. With its relatively high data rate and low maintenance cost, the popularity of unlicensed wireless systems has increased dramatically over recent years. However, the unlicensed wireless systems are limited by having small service area and low mobility. In the meantime, the licensed wireless systems are advantageous by having broad service areas and high mobility, in spite of low data rate and high usage cost.

Recently, with the advent of unlicensed mobile access (UMA) technologies converging the capabilities of licensed and unlicensed wireless technologies, UMA-enabled dual-mode terminals have been developed.

In UMA technology, a UMA network controller (UNC) enables access to voice, data, and other mobile services of a cellular communication system via an access point (AP) of an unlicensed wireless system (i.e., a wireless local area network (WLAN)) without modification of cellular system equipments such as mobile switching center (MSC), serving general packet radio service (GPRS) support node (SGSN), and gateway GPRS support node (GGSN).

Using an UMA-enabled dual-mode terminal, a subscriber can roam between cellular networks and unlicensed wireless access networks such as WLAN without breakage of ongoing voice and data services, whereby the UMA technology distributes traffic load of the cellular networks and thus improves service quality.

In order for a mobile terminal to access the services provided by a licensed wireless system via an unlicensed wireless system, the mobile terminal has to register with an UMA network (UMAN) and establish a logical connection with the UNC (i.e., a UMA radio resource (URR) connection).

Here, the mobile terminal initiates the establishment of the URR connection by sending a URR REQUEST message with activation of a timer (TU3908). If the mobile terminal receives a URR REQUEST ACCEPT message from the UNC in response to a URR REQUEST message before the TU3908 expires, a URR connection is successfully established between the mobile terminal and the UNC.

In contrast, if the mobile terminal receives a URR REQUEST REJECT message or no response message before the TU3908 expires, the URR connection fails between the mobile terminal and the UNC.

The URR REQUEST REJECT message is sent by the UNC when the UNC experiences a temporal resource shortage. Also, the UNC may not receive the URR REQUEST sent by the mobile terminal or the mobile terminal may not receive the URR REQUEST ACCEPT message or the URR REQUEST REJECT message sent by the UNC because of temporal network problems.

Accordingly, there has been a need for a reliable logical URR signaling mechanism between the mobile terminal and the UNC.

SUMMARY OF THE INVENTION

To address the above-discussed deficiencies of the prior art, it is a primary object to provide a logical channel establishment method for a mobile terminal that is robust to temporal network resource shortages and network problems.

Also, the present invention provides a logical channel establishment method that is capable of improving URR connection possibility using an improved URR REQUEST retransmission mechanism which operates in consideration of temporal network resource shortages and network problems.

Also, the present invention provides a logical connection establishment method that is capable of improving URR connection reliability between a mobile terminal and the URC by performing URR connection establishment using a retransmission mechanism operating in consideration of the signal strength of the unlicensed wireless system.

In accordance with an exemplary embodiment of the present invention, a logical channel establishment method for a mobile terminal supporting an unlicensed mobile access service includes transmitting a resource request message for establishing a logical connection to an unlicensed wireless access network via a base station; retransmitting, when a resource request rejection message is received or no response message is received before a timer expires, the resource request message after a retry timer expires; and repeating retransmission of the resource request message a threshold number of retransmission times until a logical connection is established.

In accordance with another exemplary embodiment of the present invention, a logical channel establishment method for a mobile terminal supporting an unlicensed mobile access service includes retrying, when no response is received or a resource request is rejected by an unlicensed wireless access network before a timer expires, the resource request after a first retry timer expires; checking, when no response is received or the resource request is rejected to the retrying the resource request, a number of retry times; and retrying, if the number of retry times is less than a threshold number of retry times, the resource request after a second retry timer expires.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a flowchart illustrating a logical channel establishment method for a mobile terminal according to an exemplary embodiment of the present invention.

DETAILED DESCRIPTION OF THE INVENTION

Figure 1:
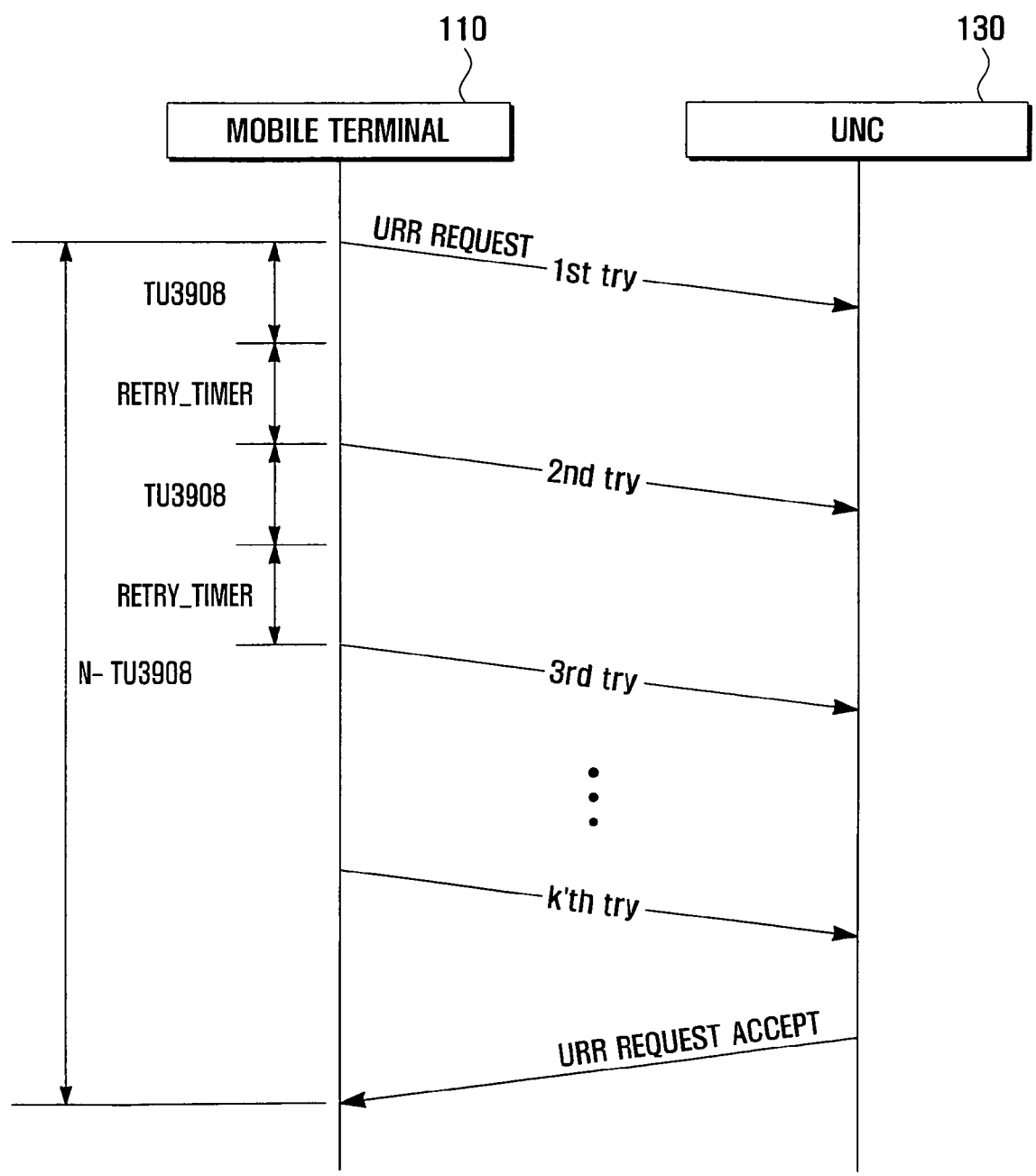
FIG. 1 is a message flow diagram illustrating a logical connection establishment method for a mobile terminal according to an exemplary embodiment of the present invention.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

The terms and phrases used in the specification and appended claims are provided to enable a clear and consistent understanding of the detailed description and the claims. Unless otherwise noted, the terms and phrases are to be understood according to conventional usage by those skilled in the relevant art.

Although the logical connection establishment method is described in association with a UMA-enabled mobile terminal in the following description, the present invention is not limited thereto. For example, the present invention can be applied to a mobile terminal supporting generic access network (GAN).

In the following, the licensed wireless system can be any or a combination of GSM, GPRS, UMTS, CDMA, CDMA2000, and their equivalents. Since these systems are well known in the art, detailed descriptions of them are omitted.

The unlicensed wireless system can be a UMA or GAN system such as WLAN including WiFi, Bluetooth, RFID, ultra wideband (UWB), and Zigbee.

In the following, the mobile terminal supports UMA or GAN technology. The mobile terminal can be any of mobile phone, portable multimedia player (PMP), MP3 player, digital broadcast receiver, personal digital assistant (PDA), laptop computer, personal computer, and the like that are enabled by communication protocols operating with the above enumerated communication systems.

In the following, when the establishment of the URR connection is failed due to resource shortages or network problems, the mobile terminal attempts establishment of the URR connection periodically. The URR connection establishment is performed in consideration of the signal strength of the serving unlicensed wireless system.

FIG. 1 is a message flow diagram illustrating a logical connection establishment method for a mobile terminal according to an exemplary embodiment of the present invention.

Referring to FIG. 1, a mobile terminal 110 sends a URR REQUEST message to a UNC 130 and starts a timer (TU3908). When the mobile terminal receives no response message or receives a URR REQUEST REJECT message before expiry of the TU3908, the mobile terminal 110 starts a retry timer (RETRY_TIMER) and sends the URR REQUEST message again when the retry timer has expired.

Here, the RETRY_TIMER is activated when no response message is received or the URR REQUEST REJECT message is received in response to the URR REQUEST message. Multiple RETRY_TIMERs can be activated according to the number of TU3908 times. The RETRY_TIMERs may be set to the same value or different values from each other. When the individual RETRY_TIMERs are set to different values of duration, the values of the timer (TU3908) can be gradually increased or decreased in duration. The values of the RETRY_TIMERs can be determined by the mobile terminal 110 and the UNC 130 in various manners.

The mobile terminal 110 repeats the attempt for establishing the URR connection N times. In this embodiment, it is assumed the URR connection is established at $K^{th}$ attempt.

If it has failed to establish the URR connection at $N^{th}$ attempt, the mobile terminal compares a UMA level (UMA_LEVEL) with a UMA threshold (UMA_THRESHOLD). The UMA_LEVEL is the signal strength of the serving unlicensed wireless network, and the UMA_THRESHOLD is a preset threshold value of the signal strength of the serving unlicensed wireless network. In this embodiment, the logical connection establishment method of the present invention is described in association with a WLAN as the unlicensed wireless network.

As a result of the comparison between the UMA_LEVEL and the UMA_THRESHOLD, if the UMA_LEVEL is less than the UMA_THRESHOLD, the mobile station scans to discover neighbor APs and requests a re-registration with the UNC 130 via an appropriate AP.

In contrast, if the UMA_LEVEL is greater than or equal to the UMA_THRESHOLD, the mobile terminal roves out to request a licensed wireless network service.

The values of N and RETRY_TIMER can be determined by the mobile terminal or the UNC, and the value of UMA_THRESHOLD is preferably determined by the mobile terminal. The N and RETRY_TIMER are determined in the duration of the timer (TU3098).

FIG. 2 is a flowchart illustrating a logical channel establishment method for a mobile terminal according to an exemplary embodiment of the present invention.

Referring to FIG. 2, the mobile terminal 110 first sends a URR REQUEST message to an unlicensed wireless system and starts a timer (TU3908) simultaneously (S201). Next, the mobile terminal 110 determines whether a response message is received from the unlicensed wireless system in response to the URR REQUEST message (S203).

If a response message is received before the timer expires, the mobile terminal determines whether the response message is a URR REQUEST ACCEPT message or a URR REQUEST REJECT message (S205).

If the response message is a URR REQUEST ACCEPT message, the mobile terminal establishes a URR connection with the UNC via the unlicensed wireless system (S207). In contrast, if the response message is a URR REQUEST REJECT message, the mobile terminal starts a RETRY_TIMER and waits until the RETRY_TIMER expires (S209). Also, when the TU 3908 has expired without reception of a response message, the mobile terminal starts a RETRY_TIMER and waits until the RETRY_TIMER expires (S209).

When the RETRY_TIMER has expired, the mobile terminal sends the URR REQUEST message to the unlicensed wireless system and activates the TU3908 again (S211). Next, the mobile terminal determines whether a response message is received in response to the URR REQUEST message (S213).

If a response message is received, the mobile terminal determines whether the response message is a URR REQUEST ACCEPT message or the URR REQUEST REJECT message (S215). If the response message is a URR REQUEST ACCEPT message, the mobile terminal establishes a URR connection with the UNC via the unlicensed wireless system (S217). In contrast, if the response message is a URR REQUEST REJECT message, the mobile terminal starts the RETRY_TIMER and checks a number of retransmission times of the URR REQUEST message (S219). Also, when the TU3908 has expired without the receipt of a response message, the mobile terminal starts the RETRY_TIMER and checks a number of retransmission times (S219). Next, the mobile terminal determines whether the number of retransmission times is equal to N (S221).

If the number of retransmission times is less than N, the mobile terminal repeats step S209. If the number of retransmission times becomes equal to N, the mobile terminal compares the UMA_LEVEL with the UMA_THRESHOLD (S223).

As a result of the comparison, if the UMA_LEVEL is less than the UMA_THRESHOLD, the mobile terminal discovers other base stations (e.g. AP) and performs registration with the UNC via a new base station (S225). In contrast, if the UMA_LEVEL is greater than or equal to the UMA_THRESHOLD, the mobile terminal roves out of the unlicensed wireless system and attempt to register with a licensed wireless system (S227).

Although the logical connection establishment method is described with the UMA-enabled mobile terminal in this embodiment, the present invention is not limited thereto. For example, the logical connection establishment method of the present invention can be applied to any type of dual mode mobile terminal supporting a GAN. In this case, the logical connection establishment procedure corresponds to a generic access circuit switched resource (GA-CSR) signaling procedure including GA-CSR REQUEST message, GA-CSR ACCEPT message, and GA-CSR REJECT message.

As described above, the logical connection establishment method for a mobile terminal according to an exemplary embodiment of the present invention sends, when failed a URR connection, a resource request message periodically in consideration of temporal network resource shortage and network problem, thereby improving the URR connection possibility. Also, the logical connection establishment method of the present invention allows the mobile terminal to rove out of the unlicensed wireless system so as to maintain the ongoing service via a licensed wireless system when the signal strength of the serving unlicensed wireless system is too weak.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A logical channel establishment method for a mobile terminal supporting an unlicensed mobile access service in an unlicensed wireless system and a licensed wireless system, comprising:
   transmitting a resource request message for establishing a logical connection to the unlicensed wireless system;
   retransmitting, when a resource request rejection message is received or no response message is received before a timer expires, the resource request message after a retry timer expires;
   repeating retransmission of the resource request message a threshold number of retransmission times until a logical connection is established;
   if the logical connection is not established after retransmitting the resource request message the threshold number of retransmission times, comparing a received signal strength of the unlicensed wireless system with a threshold value; and
   if the received signal strength is less than the threshold value, transmitting the resource request message to another base station in the unlicensed wireless system.

2. The logical channel establishment method of claim 1, further comprising if the received signal strength is more than or equal to the threshold value, attempting to register with the licensed wireless system.

3. The logical channel establishment method of claim 2, wherein retransmitting the resource request message comprises:
   waiting, when the number of retransmission times is less than the threshold number of retransmission times, until the retry timer expires.

4. The logical channel establishment method of claim 3, wherein the threshold value is determined by the mobile terminal.

5. The logical channel establishment method of claim 2, wherein the threshold number of retransmission times and the duration of the retry timer are determined by the mobile terminal and the unlicensed wireless system.

6. The logical channel establishment method of claim 5, wherein the threshold number of retransmission times and the duration of the retry timer are determined in a range of time before the timer expires.

7. The logical channel establishment method of claim 1, wherein the timer starts when the resource request message is transmitted.

8. The logical channel establishment method of claim 1, wherein the retry timer starts when the resource request rejection message is received and when the timer has expired.

9. A logical channel establishment method for a mobile terminal supporting an unlicensed mobile access service in an unlicensed wireless system and a licensed wireless system, comprising:
   retrying, when no response is received or a resource request is rejected by the unlicensed wireless system before a timer expires, the resource request after a first retry timer expires;
   checking, when no response is received or the retrying of the resource request is rejected, a number of retry times;
   retrying, if the number of retry times is less than a threshold number of retry times, the resource request after a second retry timer expires;
   when no response is received or the retrying of the resource request is rejected after retransmitting the resource request message the threshold number of retransmission times, comparing a received signal strength of the unlicensed wireless system with a threshold value; and if the received signal strength is less than the threshold value, transmitting the resource request message to another base station in the unlicensed wireless system.

10. The logical channel establishment method of claim 9, further comprising:

attempting, if the signal strength of the service base station is greater than or equal to the threshold value, to register with the licensed wireless system.

11. The logical channel establishment method of claim 10, wherein the threshold value is determined by the mobile terminal.

12. The logical channel establishment method of claim 9, wherein the first and second retry timers start when the first timer expires or a resource request rejection message is received from the unlicensed wireless system.

13. The logical channel establishment method of claim 12, wherein the first and second retry timers are set to an identical value.

14. The logical channel establishment method of claim 12, wherein the first and second retry timers are set to different values.

15. The logical channel establishment method of claim 9, wherein the threshold number of retry times and the durations of the first and second retry timers are determined by the mobile terminal and the unlicensed wireless system.

16. The logical channel establishment method of claim 15, wherein the threshold number of retry times and the durations of the first and second retry timers are determined in a range of time before the timer expires.

17. The logical channel establishment method of claim 9, wherein the timer starts when the resource request is tried.

* * * * *